United States Patent [19]
Stolzenburg et al.

[11] Patent Number: 5,994,121
[45] Date of Patent: Nov. 30, 1999

[54] METHOD FOR DEGRADING RECALCITRANT ORGANIC CONTAMINANTS

[75] Inventors: Thomas R. Stolzenburg; Marianne D. Duner, both of Madison, Wis.

[73] Assignee: RMT, Inc., Madison, Wis.

[21] Appl. No.: 09/067,178

[22] Filed: Apr. 27, 1998

[51] Int. Cl.⁶ .................................................. B09B 3/00
[52] U.S. Cl. ................. 435/262.5; 435/281; 210/606; 210/632
[58] Field of Search .............................. 435/262, 262.5, 435/281; 210/601, 606, 632

[56] References Cited

U.S. PATENT DOCUMENTS

| | | | |
|---|---|---|---|
| 5,342,779 | 8/1994 | Matsumura et al. | 435/262.5 |
| 5,614,410 | 3/1997 | Mueller et al. | 435/262.5 |
| 5,678,639 | 10/1997 | Golden | 172/52 |

OTHER PUBLICATIONS

RMT, "Multienzyme Reaction: New Biotechnology for Treating Organic Contamination in Soil", *RMT Technology Transfer*, Aug. 1997.

Group III Communications, Inc., "Bioremediation—The Russians Are Coming", http://www.sgcleanyr.com/bio/russians/html, date unknown.

Enzyme Technologies, "History", http//www.aone.com/~integris/hist.html, date unknown.

Enzyme Technologies, "Bioremediation: What is it, how does it work and why are EZT products and application systems so superior?", http://www.aone.com/~integris/bio.html, date unknown.

*Primary Examiner*—David A. Redding
*Attorney, Agent, or Firm*—Quarles & Brady LLP

[57] ABSTRACT

A method for treating a recalcitrant organic contaminant in contaminated soil or waste includes the steps of (1) maintaining indigenous bacteria or microbes in the contaminated soil or waste at a population level below which the indigenous bacteria or microbes are able to interfere with the enzyme while the enzyme acts against the contaminant and (2) exposing the contaminated soil or waste to an enzyme for a time sufficient to decrease the amount of the recalcitrant organic contaminant in the soil or waste. If the soil or waste also includes one or more readily degradable organic chemical, the method can include the additional step of reducing the content of the readily degradable organic chemical in the soil or waste.

8 Claims, No Drawings

METHOD FOR DEGRADING RECALCITRANT ORGANIC CONTAMINANTS

BACKGROUND OF THE INVENTION

Pressure to clean up contaminated sites has continued under government regulation which requires removal, reduction, destruction, or stabilization of environmentally hazardous chemical compounds. However, some contaminated soil, sludges and other media are difficult to treat in a cost-effective manner primarily due to the large molecular weight organic chemicals causing the contamination. These chemicals gain a reputation as being "recalcitrant" primarily as a result of fundamental physicochemical properties that make treatment difficult. Examples of solids contaminated with organic chemicals that are difficult to treat cost-effectively include soil contaminated with polyaromatic hydrocarbons (PAH), soil contaminated with manufactured gas plant (MGP) waste, surface soil contaminated with petroleum products such as oils, diesel fuel and bunker oil, and soils contaminated with creosote and wood tars.

Biodegradation (one potential method for remediating such contamination) involves using indigenous or introduced (i.e., non-indigenous) bacteria or other microbes to degrade or digest organic chemicals transported across their cell membranes, thereby producing byproducts such as carbon dioxide gas and water. Although biodegradation works well for small molecular weight compounds, it is very slow for large molecular weight compounds, or multi-ring compounds (e.g., PAHs). It can be difficult to biodegrade the above-noted organic chemicals because the bacteria or other microbes have difficulty transporting large, complex molecules across their cell membranes. Further, these organic chemicals typically exhibit low water solubility, and so are not very mobile. This poor mobility and consequent low concentration that partitions into solution (groundwater or soil pore water) lowers the chances that these large organic molecules are even available to bacteria for efficient biodegradation.

Mueller et al. (U.S. Pat. No. 5,614,410) describes a two stage sequential process for remediating soil or groundwater using a strain of *Pseudomonas paucimobilis* wherein in the first stage bacteria which degrade low molecular weight polycyclic aromatic hydrocarbons, heterocyclic organic compounds and phenolics are used in a pretreatment step. The remaining high molecular weight compounds are treated in a second step of the process with the *P. paucimobilis* strain, since the strain is not inhibited by low molecular weight compounds because these are removed in the first pretreatment step.

Besides biodegradation, other processes for remediating organic chemical contamination include volatilization. Volatilization is not an economically realistic option for remediating organic chemicals with large molecular weights because of low vapor pressure and high potential for adsorption to the matrix in which they reside. In other words, volatilization is too slow and expensive. Therefore, soil vapor extraction, which is dependent on high volatility, is incapable of removing these compounds from contaminated soil or waste.

In-situ soil flushing in combination with "pump and treat" is yet another method of treating soil contaminated with these large organics. The technology involves flushing large amounts of site ground water or introduced water through contaminated soil and subsequently recapturing the water with a pumping well. This technology is inefficient for high molecular weight organics because these compounds are only slightly soluble in water.

Another method for remediating recalcitrant organic chemicals in soils and wastes is the "dig and haul" method. This method involves physically digging up the contaminated solids. The contaminated solids must still be properly handled and disposed of once removed from the site. The process is costly.

Still another treatment method is thermal desorption, volatilization and recondensation/collection of vapors, or destruction of gas-phase organics via combustion or UV oxidation. This technology requires extensive materials handling and is equipment intensive. It is typically too costly, especially for small sites.

What is needed is an effective method for treating recalcitrant organic chemicals in contaminated soils and wastes quickly and easily at relatively low cost, wherein the method does not require indigenous or introduced bacteria. It would also be advantageous to have such a method that works on-site without the need to remove soil or waste for treatment elsewhere or to dispose of contaminated soil or waste.

BRIEF SUMMARY OF THE INVENTION

The present invention is summarized in that degradation of recalcitrant organic chemicals in soil or waste can be expedited in a method for treating the recalcitrant organic chemicals with extracellular enzymes. In the method, an enzyme addition step degrades recalcitrant organic chemicals in soils much faster than biodegradation by indigenous organisms, such as bacteria or other microbes, alone, or when used simultaneously with a high population of such organisms. The method specified here is also more cost effective than treating recalcitrant organics simultaneously with indigenous bacterial biodegradation and added enzyme. The invention works on-site, in-situ or ex-situ (i.e. landfarming), and is superior to dig and haul, soil flushing in combination with pump and treat, volatilization, or thermal desorption methods. The method is not limited to use at sites having any particular level of contamination. A site at which the method is effective can be broadly stated as comprising soil or waste. The applicants intend that the method can be practiced at any site from which one desires to reduce the concentration of a recalcitrant organic contaminant. For purposes of this application, a recalcitrant substance is a substance that is chemically degraded or biodegraded at an extremely slow rate if at all under ambient conditions. Without intending to limit the scope of the invention, a recalcitrant compound typically does not degrade appreciably under ambient conditions even over a period of years. Although the method is effective in situ it can also be practiced in combination with other methods that entail ex situ remediation.

In the method of the present invention, at least one enzyme that can substantially reduce or eliminate target recalcitrant organic compounds is added to contaminated soil or waste while maintaining the organisms indigenous to the contaminated site below a level at which the indigenous bacterial or microbial organisms are able to interfere with the enzyme while the enzyme acts against the contaminant. In the method, the target compounds are rapidly degraded and the enzymes are used efficiently. Since live bacteria are not necessarily introduced, there is an advantage over bioremediation in that there is no waiting period for acclimation or exponential growth. To maintain indigenous organisms at a suitable low level, the indigenous bacteria or microbes can be substantially reduced or eliminated as described herein.

Substantial reduction of the bacteria or microbes means reduction to a level at or below the maintenance level described herein. Substantial reduction of the contaminant means reduction to or below a level acceptable in the remediation task, which level can be determined on a case-by-case basis in accord with applicable regulation or other requirement or agreement. A suitable level is a contaminant reduction of 50% or more from the original levels, although in a particular case, a smaller reduction may be acceptable. More preferably, the contaminant is reduced by 60%, or still more preferably at least 75% from original levels.

The inventors found that prior methods of merely applying extracellular enzymes to the contaminated soils and wastes resulted in an ineffective use of the enzymes. Specifically, the inventors found that high concentrations of indigenous bacteria actually inhibited degradation of target chemicals by the extracellular enzymes by "feeding" on the enzymes themselves. The inventors also found that organic chemicals that are easier to degrade than the recalcitrant target organic chemicals actually inhibit the effectiveness of the enzymes on the target chemicals. The enzymes expend themselves in degrading the more readily degradable organic chemicals instead of the target chemicals. This is called competitive inhibition. The extent to which the other chemicals will be more readily degraded will vary, although for purposes of this patent application, a chemical is considered more easily degraded if it is a carbon source that can be degraded by indigenous bacteria or microbes that cannot degrade the target organic contaminant to any appreciable extent.

The inventors found that the disclosed process advantageously improves the effectiveness of the added extracellular enzymes. An objective of the process is decreasing or avoiding a high population of indigenous bacteria before adding the enzyme. Even if the indigenous bacteria survive at low levels, they are unable to recover to a population level sufficient to interfere with the action of the enzyme or enzymes that degrade the target contaminants during the time in which the enzyme or enzymes are active.

If the contaminated site also contains non-target organic contaminants that are more readily degraded than the target compounds, then a second objective is reducing the amount of the non-target organics that would otherwise competitively inhibit the activity of the added enzymes on the target chemicals. In that case, the pretreatment step can include the steps of allowing the indigenous population to increase briefly before reducing their numbers and maintaining the organisms at a suitably low level. In this scenario, the indigenous bacterial population is allowed to flourish and increase until it has consumed most of the easily degradable organic material available to it. When the readily degradable organics are depleted, the bacterial population will die off, concomitant with a decreasing food source. After such a pretreatment step, the enzyme or enzymes are added only after the pretreatment objectives are met, i.e.: (1) easily degradable organic chemical concentrations have been reduced by indigenous bacteria, and (2) the indigenous bacterial population has been reduced and is maintained at a suitably low level.

This exemplary pretreatment step is appropriately used in many soil and waste materials having significant organic chemical contamination where prior methods are ineffective. Most such soils and waste materials are anaerobic a few centimeters below the air/soil interface. In fact, in such situations, the absence of oxygen and moisture often limit biodegradation by indigenous bacteria. In typical prior methods, then, when an enzyme mixture in a water slurry is physically added into a soil, thereby causing aeration, the added enzymes merely represent a food source to the indigenous bacteria, the exponential growth of which is facilitated by the addition of water and air. As a result, the enzymes are prevented from acting efficiently upon the target organic contaminants.

Other pretreatment steps can also be used to meet the pretreatment objectives. For instance, a bactericide can be used to reduce the indigenous bacterial populations. Under some circumstances, this may be a more desirable means of achieving a bacterial population reduction, especially if there is no need to degrade the kind of contaminants that can be degraded by the indigenous bacteria. On the other hand, it may be advantageous to otherwise reduce the indigenous bacterial population without adding an additional component to the soil or waste.

Another way to increase enzyme effectiveness is to add multiple doses of enzymes in rapid succession, with very thorough mixing, aeration, and moisture addition and control while maintaining the indigenous population at an acceptably low level. The enzyme is added in sufficiently rapid succession that the population of indigenous organisms does not increase between doses to a level at which the indigenous organisms are able to interfere with the enzyme while the enzyme acts against the contaminant. One skilled in the art can monitor the target compound and can determine when an additional dose is required. An acceptably rapid series of applications is, e.g., a series of successive applications spaced apart by hours or a few days. The reaction between enzymes and target compounds is a chemical reaction whose rate depends primarily on efficient contact between the enzymes and target compounds. The chemical reaction can be very rapid if thorough mixing, and optimum moisture contact is maintained. The reaction rate can be much faster than the rate of biodegradation of enzymes by indigenous bacteria, especially when air and water are first introduced into anaerobic soil and the indigenous bacterial populations are relatively low. The bacterial population will take time to increase. Before it does, a succession of enzyme additions can react with the target organic chemicals. According to this embodiment, the enzyme reactions would be rapid, and would precede increases in indigenous bacterial population growth, by rapid mixing of enzymes and soil or waste with sufficient moisture and air. Easily degradable organic chemicals would be reduced by adding a rapid succession of enzyme doses. The first one or more enzyme additions could be of different (more economical) enzyme types, as they would be spent on easily degradable organic chemicals. The last enzyme additions would be of a type that targets recalcitrant organic chemicals, which enzymes are typically more expensive.

The present invention can be practiced using any enzyme or enzymes that can degrade the organic compounds found at a site. This invention, however, is not limited to specific enzymes, or to any one method of obtaining or preparing these enzymes. The commercially available enzymes utilized in the examples that follow were derived from bacteria found at petroleum spill sites that produced enzymes that degrade the petroleum compounds. These bacterial strains were collected and cultivated and the active enzyme was extracted. The enzymes used in the following examples are commercially available from Enzyme Technologies, Inc. (Troutdale, Oreg.).

The method can be used in combination with other remediation methods including, but not limited to, bioremediation using introduced bacteria. The present invention will be better understood upon consideration of the following detailed description of the preferred embodiment.

DETAILED DESCRIPTION OF THE INVENTION

MGP-impacted soil was first subjected to a bench-scale treatment study using simultaneous addition of enzyme and nutrient treatment, based on advice from experts who were using the enzymes. The nutrient addition was intended to stimulate population growth of indigenous bacteria at the same time enzymes were being added. Based on the study results, it was determined that simultaneous addition of the two ingredients actually inhibited the sought-for effect, i.e. the breakdown of target recalcitrant organics by enzymes. Indigenous bacteria were consuming the added enzymes. Bacterial growth was stimulated by the added nutrients and also by the addition of oxygen and water that accompanied enzyme addition. Furthermore, easily degradable organic chemicals, i.e. 2-ringed PAHs in this setting, were at much higher concentrations than high molecular weight PAHs, which were the target chemicals. In the study, target chemical concentrations were not reduced significantly after eight weeks of treatment, although easily degradable compounds were reduced substantially.

In contrast, the data presented below, from a second bench-scale study, demonstrate rapid degradation of recalcitrant PAHs within 2 weeks by adding an enzyme mixture, in the same MGP-impacted soil which had been previously subjected to simultaneous enzyme addition and extensive aerobic biodegradation by indigenous bacteria. In less than two weeks, the target organic contaminants were reduced to about 20% or less of their original levels. In certain trials the amount of contaminant after treatment was as low as about 5 or 10% of the original level.

EXAMPLE 1

Six stainless steel microcosms (21"×6.5"×6" nominal outside diameter) were used. The same amount of soil (from the previous unsuccessful test), about 4.5 kg, was added to each microcosm. Subsamples were removed for preliminary DRO (diesel range organics), PAH, and moisture content analyses. Each microcosm was labeled as follows:

(a) EZ1×1
  enzyme added, mixing once per day
  EZ2×1

(b) EZ1×4
  enzyme added, mixing 4 times per day
  EZ2×4

(c) C1×1 Untreated control, mixing once per day
  C2×4 Untreated control, mixing 4 times per day On "Day 0"

The soil was homogenized thoroughly and equal amounts were added to replicate microcosms. The microcosms were then weighed. A 0.0421 initial moisture content (MC) was assumed from previous information and the amount of moisture addition needed for a final 11% moisture content was calculated. For instance, Net Wet Wt×moisture content= moisture mass. Net Wet Wt−moisture mass=Net Dry Wt. Gross Wet Wt(0.11 MC)=(0.124×Net Dry Wt)+Net Dry Wt+Tare. (For a 10% moisture content the factor is 0.111). 8 grams of enzyme were added to the appropriate microcosms slurred into the calculated amounts of water.

The enzyme mixture used was a multi-enzyme complex called "EZT-MZC" from Enzyme Technologies, Inc., 2233 Northeast 244th, Parlor C1, Troutdale, Oreg. 97060, which, according to the vendor, was at least partially derived from Pseudomonas sp. However, any enzyme mixture which is capable of degrading target petroleum hydrocarbons would suffice.

Room temperature water was added to the control the moisture contents of microcosms. All microcosms were homogenized thoroughly. Exactly 10 g were removed each for Day 0 DRO (diesel range organics) and PAH analysis, and 20 grams for moisture content analysis. Microcosms were placed into a chamber with humidity enhancement. Moisture contents were tracked by weighing the microcosms. The EZ 1×4, EZ 2×4, and C2×4 were mixed three additional times during Day 0, and before the 4th mixing the microcosms were reweighed and moisture added to achieve a 0.11 moisture content.

On "Day 1"

All microcosms were stirred and weighed to track moisture content. Water was added as necessary to achieve 11% moisture content.

On "Days 2–11"

The aforementioned process was repeated daily until "Day 11." Between Days 8 and 9, a second dose of enzyme was added to the appropriate microcosms.

The results were as follows:

Tables 1–3 illustrate the fluoranthene, benzo(a) anthracene, and chrysene concentrations in mg/kg from Day 0 to Day 11. Table 1 shows that fluoranthene concentration has been greatly reduced, as have as the concentrations of benzo(a)anthracene shown in Table 2, and chrysene shown in Table 3.

TABLE 1

| | Fluoranthene <----------mg/kg (as is lab results ÷ (1-moisture content)---------> | | | | | | | | | |
|---|---|---|---|---|---|---|---|---|---|---|
| | Day 0 | Day 1 | Day 2 | Day 3 | Day 4 | Day 7 | Day 8 | Day 9 | Day 10 | Day 11 |
| EZ 1 × 1 | 9.2 | 5.4 | 11. | 8.8 | 8.9 | 8.1 | 7.8 | 5.2 | >2.2 | 0.65 |
| EZ 2 × 1 | 9.5 | 5.0 | 10. | 9.6 | 7.7 | 6.9 | 5.6 | 5.8 | <2.2 | 0.94 |
| EZ 1 × 4 | 9.6 | 4.0 | 8.1 | 8.9 | 8.1 | 6.7 | 6.7 | 4.3 | <2.2 | 0.46 |
| EZ 2 × 4 | 9.7 | <2.8 | 9.1 | 8.1 | 8.0 | 8.3 | 4.4 | <2.3 | <2.2 | 0.30 |
| C1 × 1 | 9.6 | 5.9 | 10. | 9.7 | 8.9 | 8.6 | 8.5 | | 8.6 | 8.2 |
| C2 × 4 | 10. | 3.2 | 9.1 | 9.3 | 8.7 | 5.5 | 8.5 | ↑ more enzyme added | 7.2 | 8.0 |

TABLE 2

Benzo (a) anthracene
<----------mg/kg (as is lab results ÷ (1-moisture content)--------->

|        | Day 0 | Day 1 | Day 2 | Day 3 | Day 4 | Day 7 | Day 8 | Day 9 | Day 10 | Day 11 |
|--------|-------|-------|-------|-------|-------|-------|-------|-------|--------|--------|
| EZ 1 × 1 | 4.5 | 2.6 | 5.0 | 4.1 | 4.6 | 4.7 | 4.5 | 2.9 | 0.92 | 0.48 |
| EZ 2 × 1 | 4.7 | 2.4 | 4.7 | 4.7 | 4.0 | 4.1 | 3.4 | 3.7 | 1.1 | 0.63 |
| EZ 1 × 4 | 4.7 | 1.9 | 3.8 | 4.1 | 4.3 | 3.9 | 4.0 | 2.5 | <0.90 | 0.31 |
| EZ 2 × 4 | 4.6 | 1.3 | 4.3 | 4.0 | 4.2 | 4.6 | 2.8 | 1.4 | <0.90 | 0.21 |
| C1 × 1 | 4.7 | 2.8 | 4.7 | 4.4 | 4.9 | 4.6 | 4.7 |  | 4.3 | 4.3 |
| C2 × 4 | 4.8 | 1.4 | 4.5 | 4.3 | 4.6 | 3.4 | 4.4 |  | 3.6 | 4.1 |

↑ more enzyme added

TABLE 3

Chrysene
<----------mg/kg (as is lab results ÷ (1-moisture content)--------->

|        | Day 0 | Day 1 | Day 2 | Day 3 | Day 4 | Day 7 | Day 8 | Day 9 | Day 10 | Day 11 |
|--------|-------|-------|-------|-------|-------|-------|-------|-------|--------|--------|
| EZ 1 × 1 | 4.5 | 2.7 | 5.3 | 4.4 | 5.1 | 5.0 | 4.9 | 2.5 | 1.3 | 0.64 |
| EZ 2 × 1 | 4.7 | 2.5 | 4.9 | 4.6 | 4.3 | 4.3 | 3.5 | 3.2 | 1.5 | 0.59 |
| EZ 1 × 4 | 4.7 | 1.9 | 3.7 | 4.2 | 4.6 | 4.1 | 4.3 | 1.5 | <0.90 | 0.34 |
| EZ 2 × 4 | 4.7 | 1.5 | 4.5 | 4.0 | 4.5 | 4.9 | 2.8 | 1.1 | <0.89 | 0.21 |
| C1 × 1 | 4.7 | 3.0 | 4.9 | 4.7 | 5.0 | 4.7 | 5.1 |  | 3.9 | 4.6 |
| C2 × 4 | 4.9 | 1.4 | 4.7 | 4.5 | 4.8 | 3.3 | 4.7 |  | 3.8 | 4.6 |

↑ more enzyme added

Various alternatives and embodiments are contemplated as being within the scope of the following claims which particularly point out and distinctly claim the subject matter regarded as the invention.

We claim:

1. A method of treating a recalcitrant organic contaminant in a contaminated soil or waste with an enzyme, the method comprising the steps of:

maintaining indigenous organisms in the contaminated soil or waste at a population level below which the indigenous organisms are able to interfere with the enzyme while the enzyme acts against the contaminant; and exposing the contaminated soil or waste to the enzyme for a time sufficient to decrease the amount of the recalcitrant organic contaminant in the soil or waste.

2. The method of claim 1 wherein the contaminated soil contains an easily degradable carbon source for the indigenous organisms, and wherein the step of maintaining the population of indigenous organisms comprises the steps of:

introducing air and water to the contaminated soil or waste so that the population of indigenous organisms increases;

allowing the indigenous organisms to degrade the carbon source so that the carbon source is substantially eliminated; and allowing the population of the indigenous organisms to decrease to a level below which the indigenous organisms are able to interfere with the enzyme while the enzyme acts against the contaminant.

3. The method of claim 1 wherein the enzyme is added in a plurality of doses in sufficiently rapid succession that the population of indigenous organisms does not increase between doses to a level at which the indigenous organisms are able to interfere with the enzyme while the enzyme acts against the contaminant.

4. The method of claim 1 wherein the step of maintaining the population indigenous organisms comprises the step of adding a bactericide to the soil or waste.

5. The method of claim 1 wherein the method further comprises the steps of:

introducing bacteria that can biodegrade an organic contaminant; and allowing the introduced bacteria to biodegrade the organic contaminant.

6. The method of claim 1 wherein the method further comprises the steps of:

stimulating the growth of indigenous bacteria that can biodegrade an organic contaminant; and allowing the stimulated bacteria to biodegrade the organic contaminant.

7. The method of claim 1 wherein the enzyme is derived from Pseudomonas sp.

8. The method of claim 1 wherein the recalcitrant organic contaminant is selected from a group consisting of an aromatic petroleum hydrocarbon, an aliphatic hydrocarbon, and a polycyclic aromatic hydrocarbon.

* * * * *